United States Patent [19]

Honda et al.

[11] 4,383,703
[45] May 17, 1983

[54] TANDEM AXLE SUSPENSION ASSEMBLY

[75] Inventors: Tetsuro Honda; Motoyuki Sato, both of Kamagaya; Toyoo Itagaki, Ichikawa, all of Japan

[73] Assignee: Mitsubishi Steel Mfg. Co., Ltd., Tokyo, Japan

[21] Appl. No.: 241,102

[22] Filed: Mar. 6, 1981

[30] Foreign Application Priority Data

Jun. 25, 1980 [JP] Japan .................... 55/86102

[51] Int. Cl.$^3$ .............................................. B60G 5/06
[52] U.S. Cl. .................................... 280/682; 280/686
[58] Field of Search ...................... 280/682, 686, 676

[56] References Cited

U.S. PATENT DOCUMENTS

| | | | |
|---|---|---|---|
| 2,577,322 | 12/1951 | Frazier | 280/682 |
| 3,767,222 | 10/1973 | Willetts | 280/682 |
| 3,799,562 | 3/1974 | Hinchliff | 280/682 |
| 3,841,652 | 10/1974 | Higginson | 280/682 |

*Primary Examiner*—Robert R. Song
*Attorney, Agent, or Firm*—LeBlanc, Nolan, Shur & Nies

[57] ABSTRACT

In a leaf spring suspension assembly for tandem axles of the so-called 4-spring short-rocker tandem suspension system type wherein a front, a center and a rear hanger are secured to the chassis of a vehicle, respectively in pairs, and positioned between an equalizer pivotally mounted to each of the center hangers and each of the front hangers as well as each of the rear hangers are a front and a rear leaf spring arranged so as to be slidable at their respective end portions, a front axle and a rear axle being respectively supported by the front and the rear leaf springs, whereby the front hanger and a portion of the front axle as well as the center hanger and a portion of the rear axle are connected together by torque rods, respectively, the equalizer being pivotably mounted to the center hanger at a position above the line connecting the sliding contact portions of the ends of the front and rear leaf springs with the ends of the equalizer by a predetermined amount, and the pivotally connecting position of the torque rods to the portion of the front or rear axles is selected to be below the lines connecting the center of the pivotally connecting position of the torque rods to the front or rear hanger with the center of the front or rear axle by a predetermined amount.

8 Claims, 13 Drawing Figures

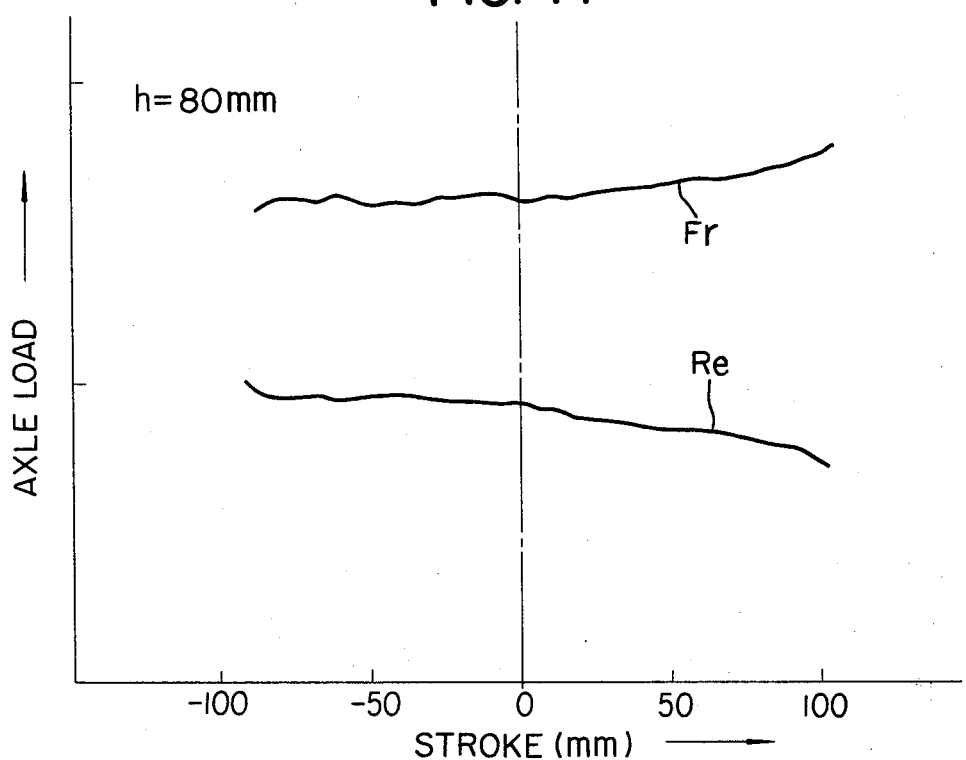
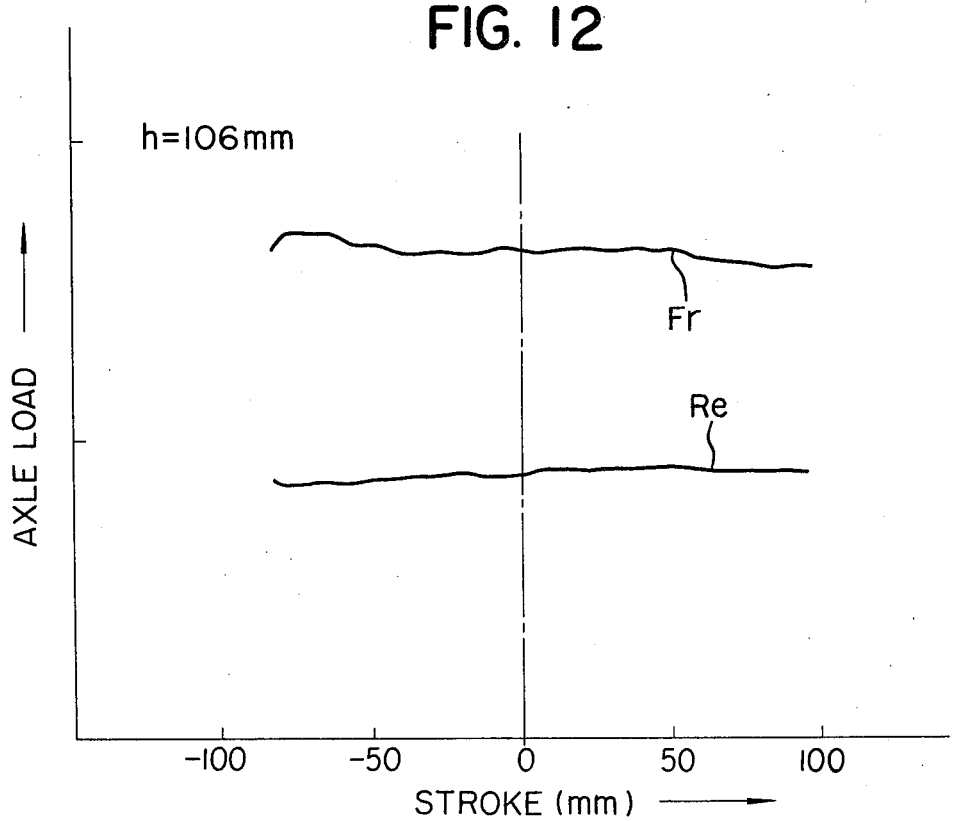

TANDEM AXLE SUSPENSION ASSEMBLY

BACKGROUND OF THE INVENTION

The present invention relates to a tandem axle leaf spring suspension assembly for vehicles and more particularly to a tandem axle leaf spring vehicle suspension of the so-called 4-spring short-rocker tandem suspension type, among systems for the suspension of the two rear axles of a vehicle wherein each of the axles is provided with a pair of semielliptic leaf springs, one disposed on each side of the vehicle, and an equalizer is arranged on each side of the vehicle between the longitudinally arranged leaf springs to equalize the loadings of the two rear axles.

In general, two types have been known with regard to 4-spring short-rocker type tandem suspension assemblies, namely, one in which shackles are used to connect the equalizers to one end of each of the leaf springs as disclosed in, e.g., U.S. Pat. No. 4,033,606, and another in which the equalizers and one end of each of the leaf springs are arranged so as to be in a direct sliding contact relationship, without the use of shackles, as disclosed in e.g., U.S. Pat. No. 3,841,652. In comparing these, although the first type is able to provide excellent equalizing efficiency, it suffers from such defects as higher cost due to the greater number of parts, a greater amount of maintenance owing to the larger number of swivel joint support portions, difficulties in construction, and so on. Contrarily, although the second type is simple in terms of its construction, it involves such problems as that there is little freedom for the selection or improvement of the equalizing characteristics, and the equalizing characteristics may be insufficient. The latter type has, however, been widely used heretofore by reason of its relatively low cost.

The present invention belongs broadly to the second above-described type of 4-spring short-rocker tandem suspension assembly.

SUMMARY OF THE INVENTION

It is an object of the present invention to provide a tandem axle vehicle suspension assembly which is able to eliminate the defects in equalizing characteristics ordinarily suffered when such systems are installed in a tractor in which only one of the two rear axles is driven i.e. in a so-called 6×2 type vehicle, or in a trailer in which one of the two rear axles is used with double tires, while the other is fitted with single tires.

It is another object of the present invention to provide a tandem axle vehicle suspension assembly which is light in weight and low in cost.

At this point it is to be understood that the term "excellent equalizing characteristics" referred to throughout the present Specification means that the axle load distribution required for a specific vehicle is maintained at a predetermined ratio, (e.g. in the case of a 6×2 type vehicle the ratio of the driven axle loading to the dead axle loading is selected to be substantially 2:1), even though the front and rear axles may move up or down in relation to each other.

As above described, the present invention aims at achieving an improvement in the second type of tandem axle suspension assembly, and in order to achieve this aim or the above objects, the present invention is intended broadly to realize the following three points:

(1) Conventionally, in a tandem axle suspension assembly of this kind, when the equalizer pivots when both the front and rear axles have been equalized, its effective leverage is caused to change, as a result of which the predetermined axle load distribution is not maintained. In order to eliminate this defect, in the present invention the rotation center of the equalizer is displaced so that the change in effective leverage is made small, such that the predetermined axle loading distribution is maintained constant over a wide range of equalization.

(2) Conventionally, in a tandem axle suspension assembly of this kind, since the contact between each of the semielliptic leaf springs of the suspension and the front and rear hangers, as well as the equalizers transmits or receives the load by means of sliding contact, when a winding-up input occurs due to the acceleration or braking of the axle, or when the axle passes dynamically over a rough road surface at speed, the sliding ends of the suspension leaf springs float, being repeatedly momentarily thrown out of mutual contact with the hangers or the equalizers, and when contact is renewed, the blow creates a knocking sound. In order to prevent the generation of such a sound, in the present invention highly wear-resistant synthetic resin or rubber pads are interposed between the contacting surfaces of the abutting members so that the generation of the knocking sound is suppressed and at the same time the wearing out of the equalizers or hangers is prevented since it is possible to exchange worn pads for new, unworn ones.

(3) Conventionally, in a 4-spring short-rocker suspension assembly, when a winding-up input is generated by the acceleration or braking of the axle as above described, the equalizers pivot considerably, promoting wear of the rotational supporting portions and sliding portions, and producing a weight transfer between the front and rear axles resulting in reduced braking power. In order to obviate such defects in a conventional tandem axle suspension assembly, in the present invention resistance to winding-up is increased by mounting the ends of the torque rods pivotally connected to the axle portions such that they are positioned a predetermined amount below the lines connecting the respective other ends of the torque rods which are pivotally connected to the front or center hangers and the centers of the front or rear axles.

BRIEF DESCRIPTION OF THE DRAWINGS

These together with other objects and advantages of the present invention which will become subsequently apparent reside in the details of constructions and operation as more fully hereinafter described and claimed, reference being had to the accompanying drawings forming a part thereof wherein like numerals refer to like parts throughout, wherein:

FIGS. 9 to 12 are diagrams showing the results of the measurement of the equalizing characteristics of the equalizers having the dimensions shown in FIGS. 7 and 8.

DESCRIPTION OF THE PREFERRED EMBODIMENT

Figure 1:
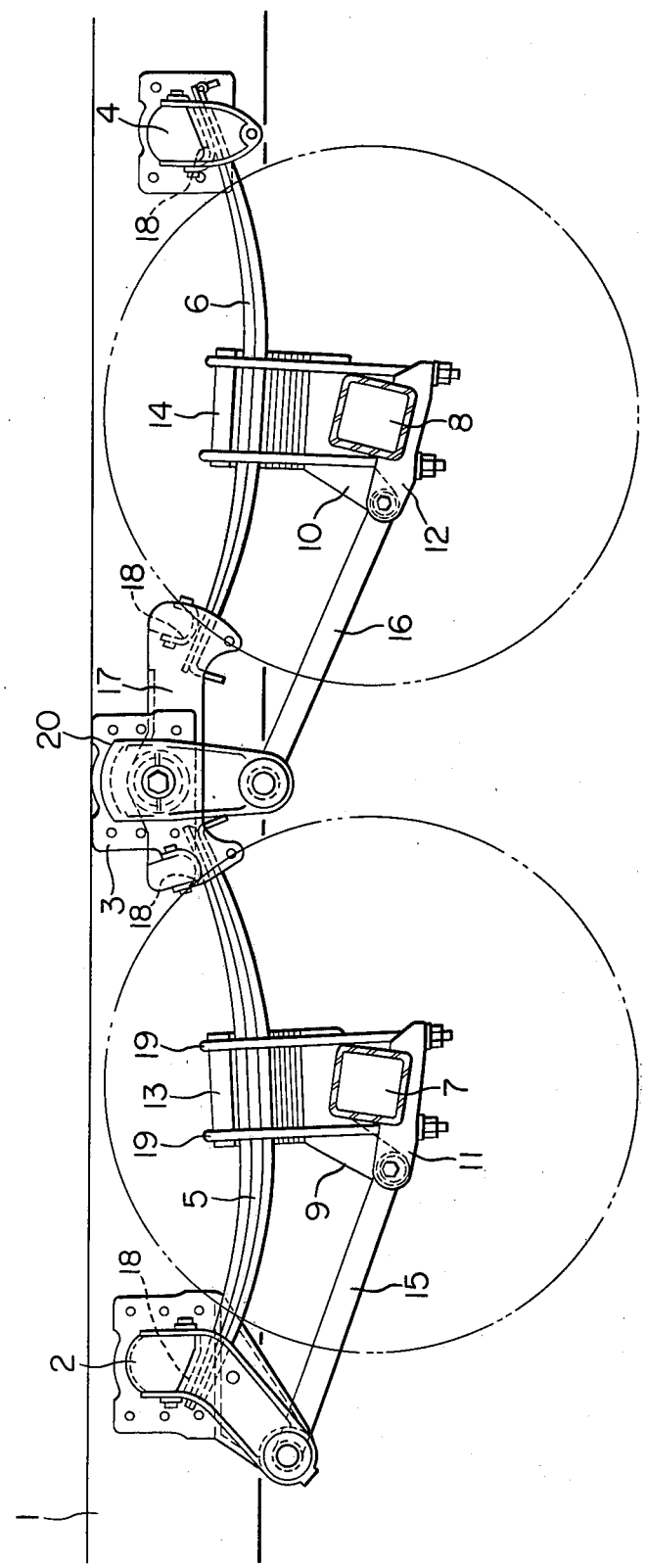
FIG. 1 is a side elevational view showing an embodiment of the present invention mounted on a vehicle frame.

Referring now to FIG. 1 of the attached drawings wherein respective reference numerals designate the following parts or elements, respectively:

1 . . . chassis frame; 2 . . . front hanger; 3 . . . center hanger; 4 . . . rear hanger; 5,6 . . . front and rear semielliptic leaf springs; 7,8 . . . front and rear axles; 9,10 . . . axle seats to mount torque rods; 11,12 . . . lower seats; 13,14 . . . upper seats; 15,16 . . . torque rods; 17 . . . equalizer; 18 . . . wear-resistant, noise-cancelling synthetic resin or rubber pads; 19 . . . U-bolts; 20 . . . rotation stopper for the equalizer.

Since the general constitution and operation of the above components are easily understandable from the drawing and the components are substantially similar to the components disclosed in U.S. Pat. No. 3,841,652 as referred to above, detailed descriptions thereabout are not given here. Reference should be made to the above patent, if required. The following is a detailed explanation of that which characterizes the present invention over the conventional tandem axle suspension assembly as given in the above U.S. patent.

Figure 2:
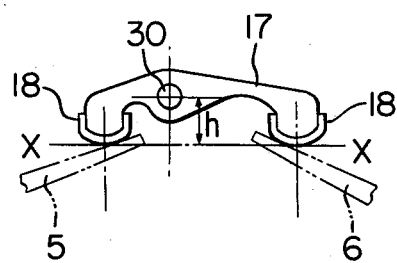
FIG. 2 is a side elevational view showing the equalizer shown in FIG. 1.

FIG. 2 shows in detail, but somewhat schematically, a portion of the equalizer 17 shown in FIG. 1. As can be seen from FIG. 2, the shape of equalizer 17 is such that its rotational center 30 to be pivotally connected to center hanger 3 is located above the line X—X connecting the contacting points at both ends thereof with front or rear leaf springs 5,6 by a distance h, and the contacting surfaces at both ends thereof which are in contact with leaf springs 5,6 are provided with wear-resistant, noise-cancelling pads 18.

Figure 3:
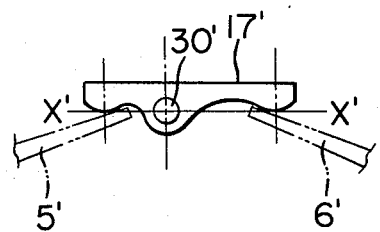
FIG. 3 is a similar view to FIG. 2, but showing a conventional equalizer.

Contrarily, FIG. 3 shows the condition of contact between equalizer 17' and front or rear leaf springs 5',6' in a conventional suspension assembly. As shown in FIG. 3, the rotational center 30' to be pivotally connected to center hanger 3 is located on the line X'—X' connecting the contacting points of equalizer 17' at both ends thereof with the leaf springs 5',6', and no wear-resistant or noise-cancelling means is provided on the contacting surfaces of the equalizer 17'.

Figure 4:
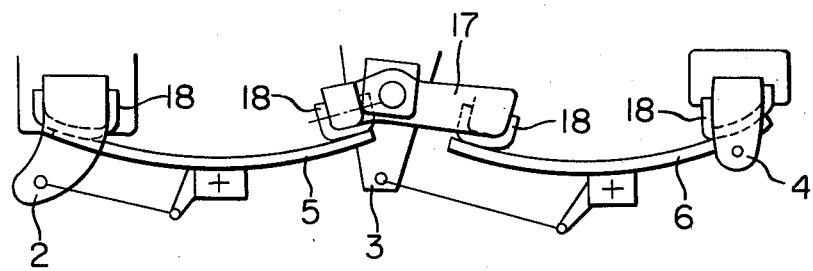
FIG. 4 is a schematical side elevational view showing the arrangement of the wear-resistant, noise-cancelling pads in the assembly shown in FIG. 1.

FIG. 4 shows the disposition, in accordance with the present invention, of a wear-resistant, noise-cancelling pad made of formed acetal resin. However, the material for the pad 18 may also be any one of the usual wear-resistant materials such as polyethylene, rubber, etc.

Figure 5:
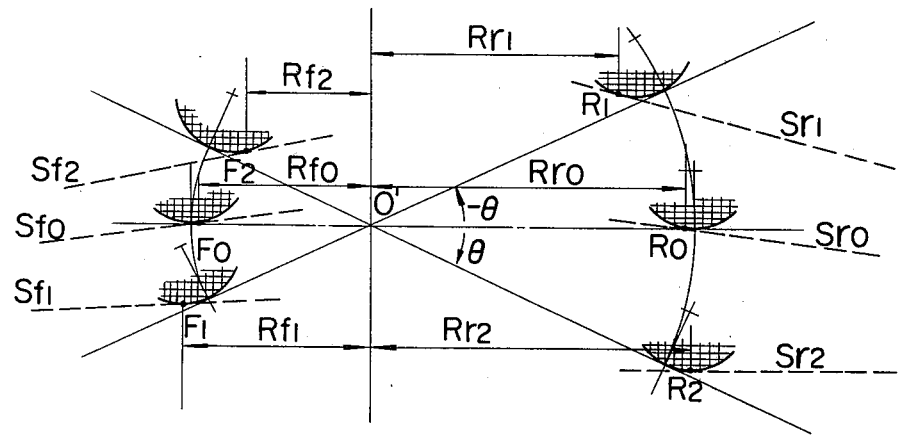
FIG. 5 is an explanatory drawing to show the operation of the conventional equalizer shown in FIG. 3.
Figure 6:
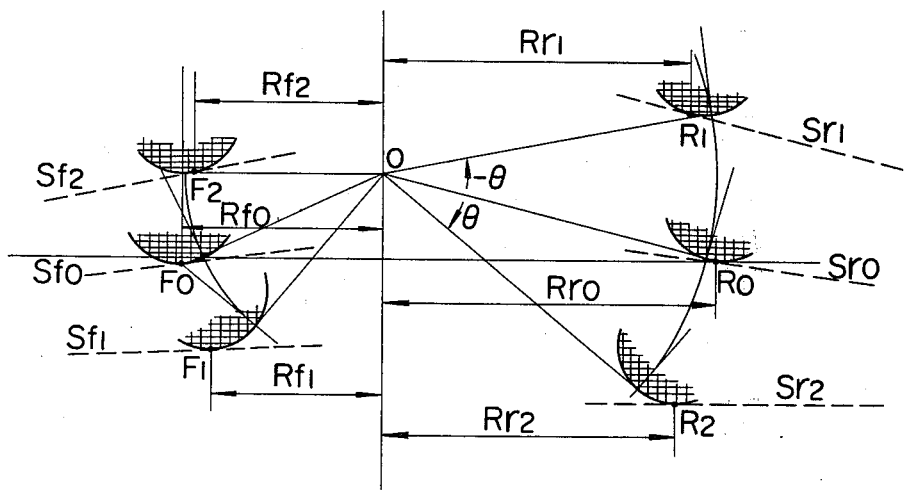
FIG. 6 is a similar view to FIG. 5, but shows the operation of the equalizer according to the present invention as shown in FIG. 2.

Now the fundamental principle of the present invention will be fully described in reference to FIGS. 5 and 6, respectively showing cases wherein a conventional equalizer and one according to the present invention are used. In these drawings, notations Sfo and Sro show the states in which the front leaf spring 5 and the rear leaf spring 6 abut to the respective contact points of equalizer 17 each with a predetermined camber with the vehicle in the horizontal state while Sf1 and Sr1 show the states in which the front and rear leaf springs 5,6 abut to the respective contact points of equalizer 17 with the equalizer rotated by $-\theta°$ as the vehicle passes over a rough road surface, with the respective cambers of the respective leaf springs 5,6 kept as initially given. At this point, it should be noted that for simplicity of analysis it is assumed that at the points of contact between the equalizers 17 or 17' and the respective leaf springs 5,6 the ends of equalizers 17 or 17' are shaped so as to have fixed radii, respectively such that the ends of the equalizers 17,17' are in contact with the leaf springs 5,6 at points $F_x$ and $R_x$ which divide the leverage such that the axle loading ratio initially given when the vehicle is in the horizontal state is achieved, wherein x represents 0, 1 or 2.

FIG. 5 shows the case of a conventional equalizer 17' as shown in FIG. 3 wherein the pivot center o' of the equalizer 17' is located on the line connecting points Fo and Ro or slightly displaced above or below the connecting line although the degree of displacement is substantially zero, while FIG. 6 shows the case of an equalizer 17 in accordance with the present invention as shown in FIG. 2 wherein the pivot center o of the equalizer 17 is displaced by an amount h above the line connecting points Fo and Ro. In both cases, since the ends of the leaf springs 5 and 6 opposite to the ends in contact with the equalizer 17' or 17 are in contact with the leaf spring contact portions of the stationary front and rear hangers 2,4, when differences in height arise between the front and the rear axles 7,8, it is apparent that the equalizers 5,6 come into contact with the equalizers 17 or 17' in the Sf1 and Sr1 state. In a tandem axled vehicle, when one axle is provided as a driven axle, an angle $\alpha$ made between the contact surfaces of the leaf springs 5,6 and the horizontal is as follows: (i) when the equalizer 17 is horizontal, $\alpha_{fo}=7°$, $\alpha_{ro}=7°$ (the angle $\alpha$ being measured as positive when the camber has an upward inclination as viewed from the center of the leaf spring); (ii) when the equalizer 17 has rotated in a direction so as to have the rear axle raised relative to the front axle by an angle $\theta$ till it abuts against the stopper 20, where $\theta=25°$ (in the anticlockwise direction), $\alpha_{f1}=3°$ and $\alpha_{r1}=14°$; and (iii) in the case where the equalizer has rotated in a reverse direction so as to have the rear axle lowered relative to the front axle by an angle $\theta°$, where $\theta=25°$, $\alpha_{f2}=11°$ and $\alpha_{r2}\approx0°$. In these circumstances, when the effect in the case of an upwards displacement h of the pivot center O of equalizer 17 is compared with the case where no displacement is apparent, referring to FIGS. 5 and 6, it is apparent that when the equalizers 17 or 17' are in a horizontal state, the effective lever lengths are $R_{fo}$ and $R_{ro}$, and as shown in either FIG. 5 or FIG. 6, equalizer 17 or 17' can be designed so as to have an identical axle loading ratio. However, when the equalizer is rotated through an angle $\theta°$, e.g. $-25°$, the effective lever lengths become $R_{f1}$ and $R_{r1}$, respectively. In this case, the major differences between the cases shown in FIGS. 5 and 6 reside in the following points: (1) In the case shown in FIG. 5 wherein the displacement of the pivot center is zero or small:

$R_{f1} > R_{fo}$ and $R_{r1} < R_{ro}$;

(ii) In the case shown in FIG. 6 wherein displacement h is given to the pivot center:

$R_{f1} < R_{fo}$ and $R_{r1} < R_{ro}$.

Thus, as to the ratio $R_f/R_r$ which determines the actual axle loading ratio, in the case shown in FIG. 5, since the relationship of the magnitudes in the ratio is reversed between the cases where $\theta = 0°$ and where $\theta = 25°$, the ratio $R_f/R_r$ changes considerably. Contrarily, in the case shown in FIG. 6, since the magnitude of the ratio remains substantially unchanged even when the angle changes by the same amount, rotating through an angle $\theta$, as in the previous case, the ratio $R_f/R_r$ is subjected to substantially no change.

Contrarily, when the equalizer has been rotated in a reverse direction (i.e. in the clockwise direction) through $\theta = 25°$, the effective lever length in the case shown in FIG. 5 results in:

$R_{f2} < R_{fo}$ and $R_{r2} > R_{ro}$;

whereas, in the case shown in FIG. 6 it results in:

$R_{f2} < R_{fo}$ and $R_{r2} < R_{ro}$.

Thus, it will be appreciated that the change in the ratio $R_f/R_r$ is less in the case shown in FIG. 6 than in the case shown in FIG. 5 for the same reasons as apply when $\theta = -25°$ as above explained.

Since, in this manner, any change in the ratio $R_f/R_r$ between the initial state and the state where the equalizer has been operated through its full stroke and is abutted against the stopper, is small, the equalizing characteristics of the suspension maintain the initial axle loading ratio fixed and without change. Therefore, it is apparent that the dynamic characteristics (i.e. driving force and braking force) can be made stable.

Figure 7:
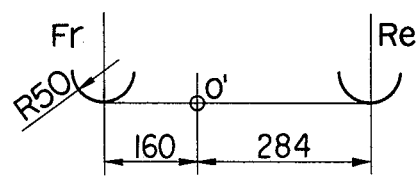
FIG. 7 is a schematical representation showing the dimensions of a conventional equalizer which was used for measuring its equalizing characteristics.
Figure 8:
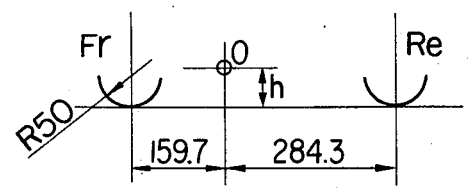
FIG. 8 is a similar representation to FIG. 7, but showing the dimensions of an equalizer in accordance with the present invention which was used for measuring its equalizing characteristics.

The following is a numerical example of the present invention. The equalizing characteristics in a tandem axle suspension assembly in which the fundamental whole length of an equalizer is 444 mm, one of the two rear axles being provided to be driven, the radius R of the respective ends of the equalizer is 50 mm and the rotational angle of the equalizer is ±25°, were measured for the following conditions, respectively: the degree of displacement h of the pivot center of the equalizer upwards is 0 mm (as shown in FIG. 7) and 60, 80 and 106 mm (as shown in FIG. 8). The results are shown in Table 1 as well as in FIGS. 9 to 12 in which the stroke (mm) of the equalizer and the axle loading (kg) are taken as the abscissa and the ordinate, respectively.

TABLE 1

| Rotational Angle of Equalizer ($\theta°$) | Effective Leverage $R_r/R_e$ Displacement Amount (mm) | | | |
|---|---|---|---|---|
| | 0 | 60 | 80 | 106 |
| +25 | 1/2.46 | 1/1.83 | 1/1.67 | 1/1.49 |
| 0 | 1/1.79 | 1/1.79 | 1/1.79 | 1/1.79 |
| −25 | 1/1.37 | 1/1.79 | 1/1.97 | 1/2.22 |

Note:
The rotational angle of the equalizer is taken as + when the Fr side is rotated upwards.

Figure 9:
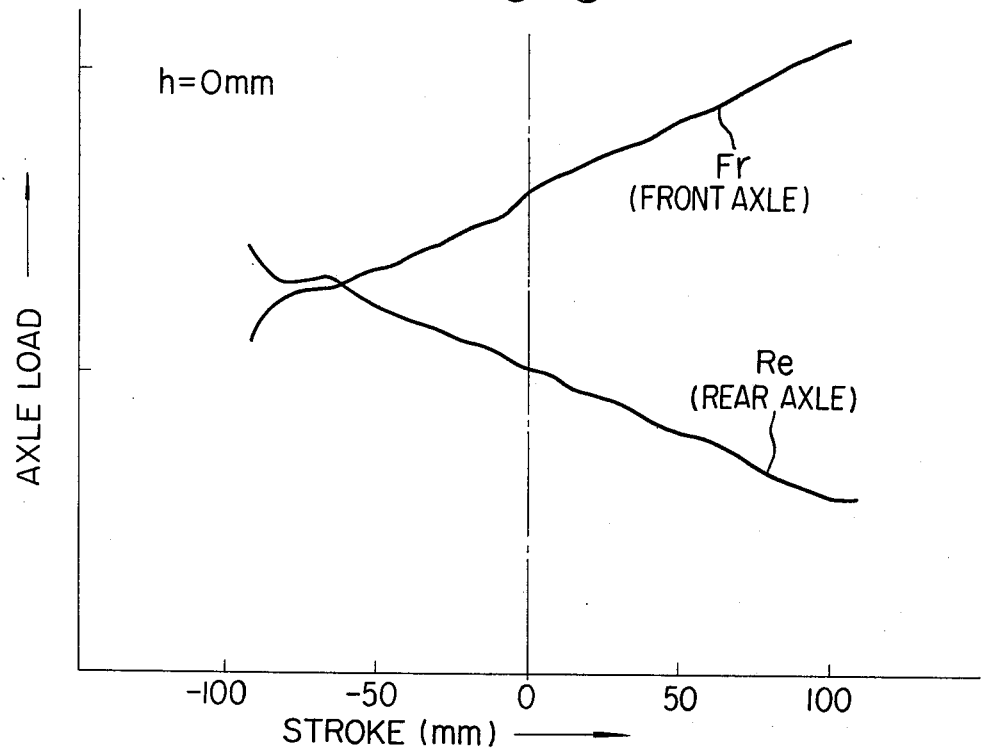
Figure 10:
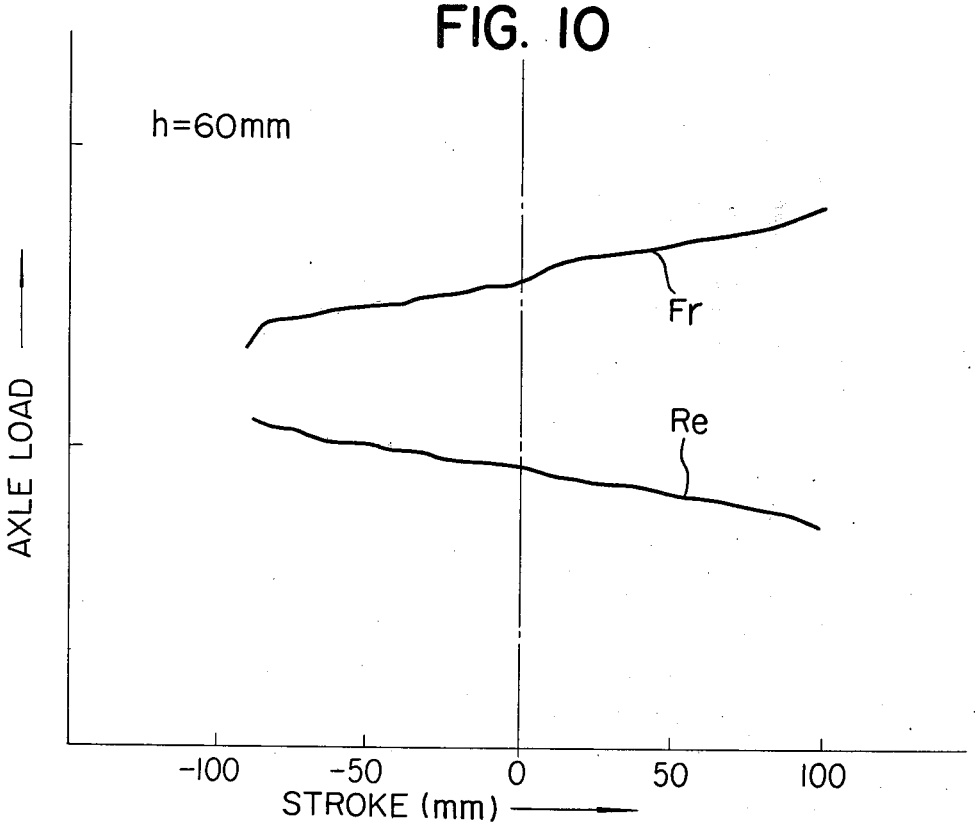

From these results it will be understood that in the case of a degree of displacement h of 0 mm, as shown in FIG. 9, the axle loading ratio changes considerably as a result of the change in the stroke, while, as the degree of displacement h is made 60, 80 and 106 mm, as shown in FIGS. 10 to 12, the change in the axle loading ratio becomes small, in particular, with a value of h of 80 mm no change is observed (see FIG. 11), although with a value of h of 106 mm the reverse tendency is observed (see FIG. 12).

Although the present invention is principally characterized in the equalizer having a constitution and operation such as that above described, it also contemplates reducing the rotational angle of the equalizer as well as the change in axle loading between the front and the rear axles at a time of braking induced winding-up, by adopting the procedure whereby the mounting positions of the respective axle seat 9, 10 ends of the torque rod 15 linking the front hanger 2 and the axle seat 9 and the torque rod 16 linking the center hanger 3 and the axle seat 10 are made lower, respectively, than the line connecting the center of the mounting position of the front hanger 2 and the torque rod 15 and the center of front axle 7, and the line connecting the center of the mounting position of the center hanger 3 and the torque rod 16 and the center of rear axle 8.

The following is an explanation of the results of experiments carried out as to the above feature of the present invention.

Figure 13:
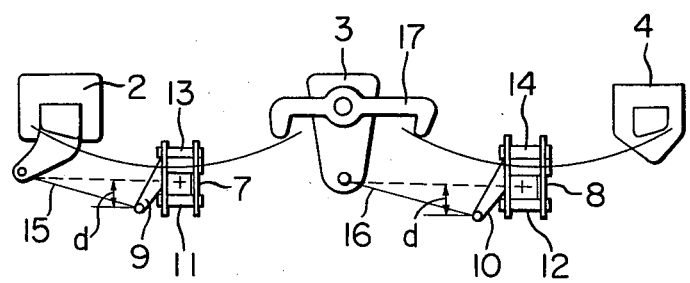
FIG. 13 is a schematical view showing the pivotal connecting points of the torque rods shown in FIG. 1 to the front and center hangers as well as to the axle seats.

As shown in FIG. 13, in the case where the vertical distance d measured between the line connecting the center of the mounting position of the front hanger 2 to the other end of the torque rod 15 with the center of the front axle 7, and the connecting point of the one end of the torque rod 15 to the front axle seat 9 and the vertical distance d measured between the line connecting the center of the mounting position of the center hanger 3 to the other end of the torque rod 16 with the center of the rear axle 8 and the connecting point of the one end of the torque rod 16 to the rear axle seat 10 are each 0 mm and 80 mm, the changes in angle of the equalizer and in the axle loading variation ratio of front axle 7 and rear axle 8 were measured. The results are shown in Table 2.

TABLE 2

| d(mm) | 20 | 80 |
|---|---|---|
| Change in Equalizer Angle ($\theta°$) | 13.4 | 3.2 |
| Front Axle Loading Variation Ratio | 0.5 | 0.73 |
| Rear Axle Loading Variation Ratio | 1.2 | 1.05 |

Note:
(1) The magnitude of the braking winding-up is 0.6 G wherein G represents an axle loading without the winding-up.
(2) The axle loading variation ratio is a ratio taken relative to the initial axle loading in the state when there is no braking winding-up.
(3) It is desirable that the axle loading variation ratio be as near as possible to 1, since when the axle loading variation ratio has such a value the change in axle loading at times of braking winding up is small.

From these results, it will be observed that by making the vertical distance d 80 mm the rotation angle of the equalizer at a time of braking winding-up is made a quarter of that when d=20 mm, and the front and rear axle loading ratios are 0.73 and 1.05, respectively, showing that they approach 1, reducing the axle loading variation ratio.

The foregoing is considered as illustrative only of the principles of the present invention. Further, since numerous modifications and changes will readily occur to those skilled in the art, it is not desired to limit the invention to the exact construction and operation shown and described, and accordingly all appropriate modifications and equivalents may be resorted to, falling within the scope of the invention.

What is claimed is:

1. In a tandem axle suspension assembly for vehicles wherein a front, a center and a rear hanger means and an equalizer means are mounted to each side of the chassis frame of a vehicle with, on each side of the chassis, a front leaf spring means and a rear leaf spring means being respectively disposed between said front hanger means and a said equalizer means pivotally connected to said center hanger means, and between said equalizer means and said rear hanger means so that the upper end surfaces of said front and rear leaf spring means are in sliding contact with said front and rear hanger means as well as with said equalizer means, said front and rear leaf spring means carrying a front and a rear axle means respectively, and said front hanger means and a portion of said front axle means as well as said center hanger means and a portion of said rear axle means are pivotally connected together by torque rod means, respectively, said equalizer means having said pivotally connecting position to said center hanger means located substantially above the connecting the innermost points of sliding contact of said equalizer means with the upper surfaces of said front and rear leaf spring means.

2. A tandem axle suspension assembly for vehicles as claimed in claim 1 wherein said pivotally connecting position of said torque rod means to said portion of said front or rear axle means is selected to be below the lines connecting the center of said pivotally connecting position of said torque rod means to said front or center hanger means and the centers of said front and rear axles.

3. A tandem axle suspension assembly for vehicles as claimed in claim 1 or 2 wherein in the case where the whole length of said equalizer means is 400 to 550 mm, said pivotally connecting position of said equalizer means to said center hanger means is selected to be above said line connecting said sliding portions of said ends of said front and rear leaf spring means with said equalizer means by 50 to 120 mm, and said pivotally connecting position is selected to be placed relative to the length of said equalizer means such that it divides the whole length of said equalizer means into a ratio equal to the inverse of the axle loading ratio sought.

4. A tendem axle suspension assembly for vehicles as claimed in claim 1 or 2 wherein in the case where the whole length of said equalizer means is 400 to 550 mm, said pivotally connecting position of said torque rods to said portion of said front or rear axle means is selected to be below said lines connecting the center of said pivotally connecting position of said torque rod means to said front or rear hanger means with the center of said front or rear axle means, by 50 to 160 mm.

5. A leaf spring suspension assembly for tandem axles as claimed in claim 1 or 2, wherein said sliding portions with said front and rear hanger as well as said equalizer means are respectively provided with wear-resistant, noise-cancelling pad means.

6. A tandem axle suspension assembly for vehicles as claimed in claim 1 or 2, wherein said sliding portions of said ends of said front and rear spring means with said front and rear hanger means are provided with wear-resistant, noise-cancelling pad means.

7. A tandem axle suspension assembly for vehicles as claimed in claim 5 wherein said wear-resistant, noise-cancelling pad means is made of polyethylene, acetal resin or rubber.

8. A tandem axle suspension assembly for vehicles as claimed in claim 6 wherein said wear-resistant, noise-cancelling pad means is made of polyethylene, acetal resin or rubber.

* * * * *